(12) United States Patent
Dong et al.

(10) Patent No.: US 9,210,189 B2
(45) Date of Patent: Dec. 8, 2015

(54) METHOD, SYSTEM AND CLIENT TERMINAL FOR DETECTION OF PHISHING WEBSITES

(71) Applicant: TENCENT TECHNOLOGY (SHENZHEN) COMPANY LIMITED, Shenzhen, Guangdong (CN)

(72) Inventors: Wenhui Dong, Shenzhen (CN); Fudong Shao, Shenzhen (CN)

(73) Assignee: TENCENT TECHNOLOGY (SHENZHEN) COMPANY LIMITED, Shenzhen, Guangdong (CN)

( * ) Notice: Subject to any disclaimer, the term of this patent is extended or adjusted under 35 U.S.C. 154(b) by 0 days.

(21) Appl. No.: 14/065,849

(22) Filed: Oct. 29, 2013

(65) Prior Publication Data

US 2014/0096242 A1    Apr. 3, 2014

(30) Foreign Application Priority Data

Jul. 17, 2012 (CN) .......................... 2012 1 0247230

(51) Int. Cl.
*H04L 29/06* (2006.01)
*H04L 29/08* (2006.01)

(52) U.S. Cl.
CPC ............ *H04L 63/1483* (2013.01); *H04L 63/14* (2013.01); *H04L 63/1441* (2013.01); *H04L 67/02* (2013.01)

(58) Field of Classification Search
CPC ..................... H04L 63/1483; H04L 63/1441
USPC ..................................................... 726/22, 25
See application file for complete search history.

(56) References Cited

U.S. PATENT DOCUMENTS

| 8,521,667 B2* | 8/2013 | Zhu .......................... G06F 21/56 706/13 |
| 8,712,907 B1* | 4/2014 | Stibel et al. ..................... 705/38 |
| 8,719,940 B1* | 5/2014 | Higbee ............... H04L 63/1475 709/206 |
| 8,966,582 B1* | 2/2015 | Ainslie ................... G06F 21/51 726/2 |
| 2006/0168066 A1* | 7/2006 | Helsper et al. ................ 709/206 |
| 2009/0070872 A1* | 3/2009 | Cowings et al. ................ 726/23 |
| 2010/0042687 A1 | 2/2010 | Wang |

(Continued)

FOREIGN PATENT DOCUMENTS

| CN | 102170447 A | 8/2011 |
| CN | 102231745 A | 11/2011 |

(Continued)

OTHER PUBLICATIONS

State Intellectual Property Office of P. R. China (ISR/CN), "International Search Report", China, Oct. 24, 2013.
State Intellectual Property Office of P. R. China (ISR/CN), "Written Opinion of the International Searching Authority", China, Oct. 24, 2013.

(Continued)

*Primary Examiner* — Linglan Edwards
(74) *Attorney, Agent, or Firm* — Tim Tingkang Xia; Locke Lord LLP

(57) ABSTRACT

One aspect of the present invention relates to a method for detecting a phishing website. The method includes acquiring information related to a microblog post containing a uniform resource locator (URL) of a website; analyzing the information related to the microblog post to extract features of the microblog post; calculating credibility of the URL of the website contained in the microblog post according to the extracted features of the microblog post; and determining according to the credibility of the URL of the website whether the URL of the website is a URL of a phishing website.

13 Claims, 2 Drawing Sheets

(56) References Cited

U.S. PATENT DOCUMENTS

| | | | |
|---|---|---|---|
| 2013/0067562 A1* | 3/2013 | Davis et al. | 726/14 |
| 2013/0124644 A1* | 5/2013 | Hunt et al. | 709/206 |
| 2013/0185802 A1* | 7/2013 | Tibeica et al. | 726/26 |
| 2014/0298460 A1* | 10/2014 | Xue | H04L 63/1425 726/23 |

FOREIGN PATENT DOCUMENTS

| | | | |
|---|---|---|---|
| CN | 102279875 A | 12/2011 | |
| CN | 101534306 A | 1/2012 | |
| CN | 102355469 A | 2/2012 | |
| CN | 102394798 A | 3/2012 | |
| CN | 102571485 A | 7/2012 | |
| KR | 20080024804 A | 3/2008 | |

OTHER PUBLICATIONS

State Intellectual Property Office of the People's Republic of China, "Search Report", China, Aug. 25, 2014.

State Intellectual Property Office of the People's Republic of China, "Office Action", China, Sep. 2, 2014.

Korean Intellectual Property Office, "Office Action for Application No. 10-2015-7000809", Korea, Mar. 18, 2015.

Carlos Castillo et al., Information Credibility on Twitter, WWW 2011—Session: Information Credibility, Mar. 20-Apr. 1, 2011, pp. 675-684, Hyderabad, India.

Ranjith Unnikrishnan et al., Toward Objective Evaluation of Image Segmentation Algorithms, IEEE Transactions on Pattern Analysis and Machine Intelligence, Jun. 2007, pp. 929-944, vol. 29, No. 6.

\* cited by examiner

METHOD, SYSTEM AND CLIENT TERMINAL FOR DETECTION OF PHISHING WEBSITES

CROSS-REFERENCE TO RELATED APPLICATIONS

This application is a continuation application of International Patent Application No. PCT/CN2013/079376, filed Jul. 15, 2013, which itself claims the priority to Chinese Patent Application No. 201210247230.9, filed Jul. 17, 2012 in the State Intellectual Property Office of P.R. China, which are hereby incorporated herein in their entireties by reference.

FIELD OF THE INVENTION

The present invention relates generally to the field of Internet, and more particularly to method, system and client terminal for detection of a phishing website.

BACKGROUND OF THE INVENTION

With popularization of the Internet, more and more users use the Internet to communicate with each other and conduct business transactions. Accordingly, Internet services such as e-commerce and e-bank are developed. When accessing a website, a user needs to input information such as an account and a password. Only when the input information such as the account and password is correct, can the user log in to the website to perform online operations. The account and password of the user are a unique identifier for the user to log in to such websites to perform operations. Once someone steals the account and password of the user and impersonates the user to log in to the website, the interests of the user may be affected. At present, some malicious parties use a phishing website to display a webpage similar to a legitimate website to a user, lure the user into inputting the account and password, and steal the account and password of the user. A phishing website refers to a counterfeit website which is configured by a malicious party through various means to mimic the uniform resource locator (URL) and webpage content of a legitimate website for the purpose of stealing private data such as accounts and passwords of users.

In addition, as indicated by "The 29th Statistical Survey Report on the Internet Development in China" released by the China Internet Network Information Center, up to the end of December, 2011, the number of microblog users has reached 250 millions, the number of microblog accounts registered on various websites is about 800 millions, and the number of microblog messages posted each day has reached 200 millions. The microblog has become one of important network services in daily life, is increasingly penetrating into the social life, and has become an important way for people to acquire information (for example, a URL of a website). However, a URL of a website contained in a microblog post may be a URL of a phishing website, and it cannot be determined in the prior art whether a URL of a website contained in a microblog post is a URL of a phishing website, resulting in inconvenience for users.

Therefore, a heretofore unaddressed need exists in the art to address the aforementioned deficiencies and inadequacies.

SUMMARY OF THE INVENTION

One of the objectives of the present invention is to provide method, system and client terminal for detecting a phishing website, so as to solve the problem in the prior art that it cannot be determined whether a URL of a website contained in a microblog post is a URL of a phishing website.

In one aspect, the present invention relates to a method for detecting a phishing website. In one embodiment, the method includes acquiring information related to a microblog post containing a uniform resource locator (URL) of a website; analyzing the information related to the microblog post to extract features of the microblog post; calculating credibility of the URL of the website contained in the microblog post according to the extracted features of the microblog post; and determining according to the credibility of the URL of the website whether the URL of the website is a URL of a phishing website.

In another aspect, the present invention provides a system for detecting a phishing website. In one embodiment, the system includes an acquisition module, configured to acquire information related to a microblog post containing a uniform resource locator (URL) of a website; an analysis module, configured to analyze the information related to the microblog post to extract features of the microblog post; a calculation module, configured to calculate credibility of the URL of the website contained in the microblog post according to the extracted features of the microblog post; and a determining module, configured to determine according to the credibility of the URL of the website whether the URL of the website is a URL of a phishing website.

In yet another aspect, the present invention provides a client terminal, including the foregoing system for detecting a phishing website.

In a further aspect, the present invention relates to a non-transitory computer-readable medium storing instructions which, when executed by one or more processors, cause the system to perform the above method for detecting a phishing website.

In the present invention, information related to a microblog post containing a URL of a website is acquired, features of the microblog post are extracted from the information related to the microblog post, and credibility of the URL of the website contained in the microblog post is calculated according to the extracted features of the microblog post, so as to determine whether the URL of the website is a URL of a phishing website. Therefore, the present invention solves the problem in the prior art that it cannot be determined whether a URL of a website contained in a microblog post is a URL of a phishing website, thereby providing convenience for users.

These and other aspects of the present invention will become apparent from the following description of the preferred embodiment taken in conjunction with the following drawings, although variations and modifications therein may be affected without departing from the spirit and scope of the novel concepts of the disclosure.

BRIEF DESCRIPTION OF THE DRAWINGS

The accompanying drawings illustrate one or more embodiments of the invention and, together with the written description, serve to explain the principles of the invention. Wherever possible, the same reference numbers are used throughout the drawings to refer to the same or like elements of an embodiment. The drawings do not limit the present invention to the specific embodiments disclosed and described herein. The drawings are not necessarily to scale, emphasis instead being placed upon clearly illustrating the principles of the invention.

DETAILED DESCRIPTION OF THE INVENTION

Figure 1:
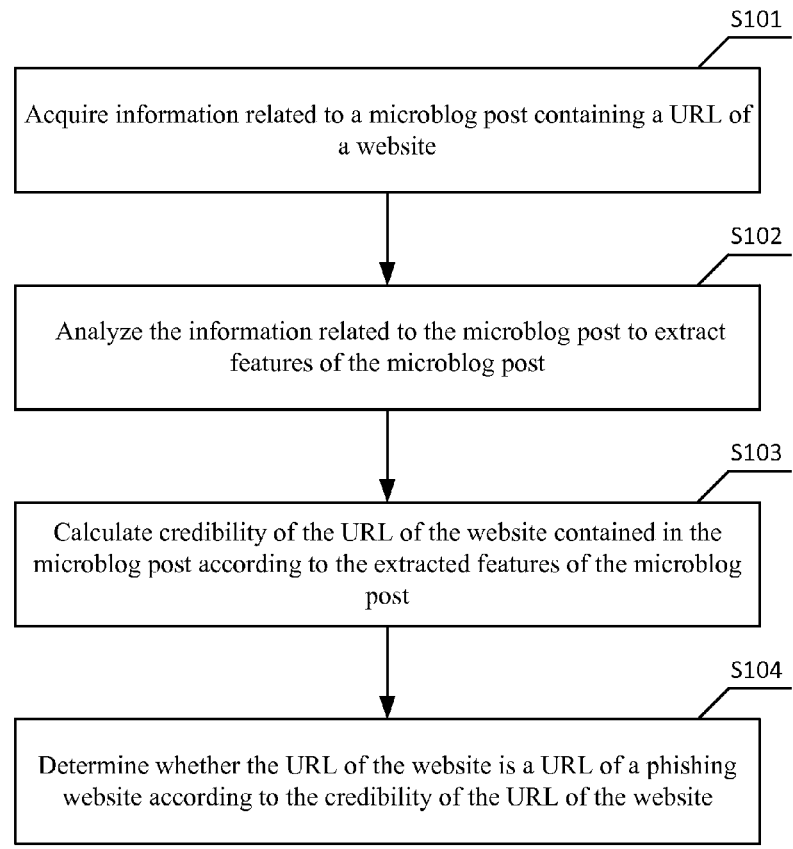
FIG. 1 is a flowchart of a method for detecting a phishing website according to one embodiment of the present invention.

The following description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. For purposes of clarity, the same reference numbers will be used in the drawings to identify similar elements.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. The use of examples anywhere in this specification, including examples of any terms discussed herein, is illustrative only, and in no way limits the scope and meaning of the disclosure or of any exemplified term. Likewise, the disclosure is not limited to various embodiments given in this specification.

As used in the description herein and throughout the claims that follow, the meaning of "a", "an", and "the" includes plural reference unless the context clearly dictates otherwise. Also, as used in the description herein and throughout the claims that follow, the meaning of "in" includes "in" and "on" unless the context clearly dictates otherwise.

As used herein, the terms "comprising," "including," "having," "containing," "involving," and the like are to be understood to be open-ended, i.e., to mean including but not limited to.

As used herein, the phrase "at least one of A, B, and C" should be construed to mean a logical (A or B or C), using a non-exclusive logical OR. It should be understood that one or more steps within a method may be executed in different order (or concurrently) without altering the principles of the present disclosure.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

The term "code", as used herein, may include software, firmware, and/or microcode, and may refer to programs, routines, functions, classes, and/or objects. The term "shared", as used herein, means that some or all code from multiple modules may be executed using a single (shared) processor. In addition, some or all code from multiple modules may be stored by a single (shared) memory. The term "group", as used herein, means that some or all code from a single module may be executed using a group of processors. In addition, some or all code from a single module may be stored using a group of memories.

The systems and methods described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

The description will be made as to the embodiments of the present invention in conjunction with the accompanying drawings in FIGS. 1-4. It should be understood that specific embodiments described herein are merely intended to explain the present invention, but not intended to limit the present invention. In accordance with the purposes of this invention, as embodied and broadly described herein, this invention, in one aspect, relates to method, system and client terminal for detection of phishing websites.

Referring to FIG. 1, a flowchart of a method for detecting a phishing website is shown according to a first embodiment of the present invention. In one embodiment, the method includes the following steps:

At step S101: information related to a microblog post containing a URL of a website is acquired.

In one embodiment, the information related to the microblog post includes functional features, social networking features and propagation features.

At step S102: the information related to the microblog post is analyzed so as to extract features of the microblog post.

In one embodiment, the features of the microblog post include functional features, social networking features and propagation features of the microblog post.

At step S103: credibility of the URL of the website contained in the microblog post is calculated according to the extracted features of the microblog post.

At step S104: whether the URL of the website is a URL of a phishing website is determined according to the credibility of the URL of the website.

Figure 2:
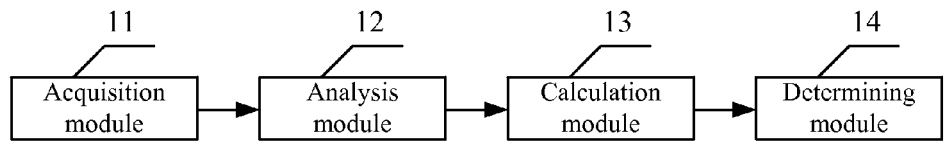
FIG. 2 is a functional block diagram of a system for detecting a phishing website according to one embodiment of the present invention.

Referring to FIG. 2, a system for detecting a phishing website is shown according to one embodiment of the present invention. The system includes an acquisition module 11, an analysis module 12, a calculation module 13, and a determining module 14.

The acquisition module 11 is configured to acquire information related to a microblog post containing a URL of a website. In the exemplary embodiment, the information related to the microblog post includes functional features, social networking features and propagation features.

The analysis module 12 is configured to analyze the information related to the microblog post to extract features of the microblog post. In this embodiment, the features of the microblog post include functional features, social networking features and propagation features of the microblog post.

The calculation module 13 is configured to calculate credibility of the URL of the website contained in the microblog post according to the extracted features of the microblog post.

The determining module 14 is configured to determine according to the credibility of the URL of the website whether the URL of the website is a URL of a phishing website.

Figure 3:
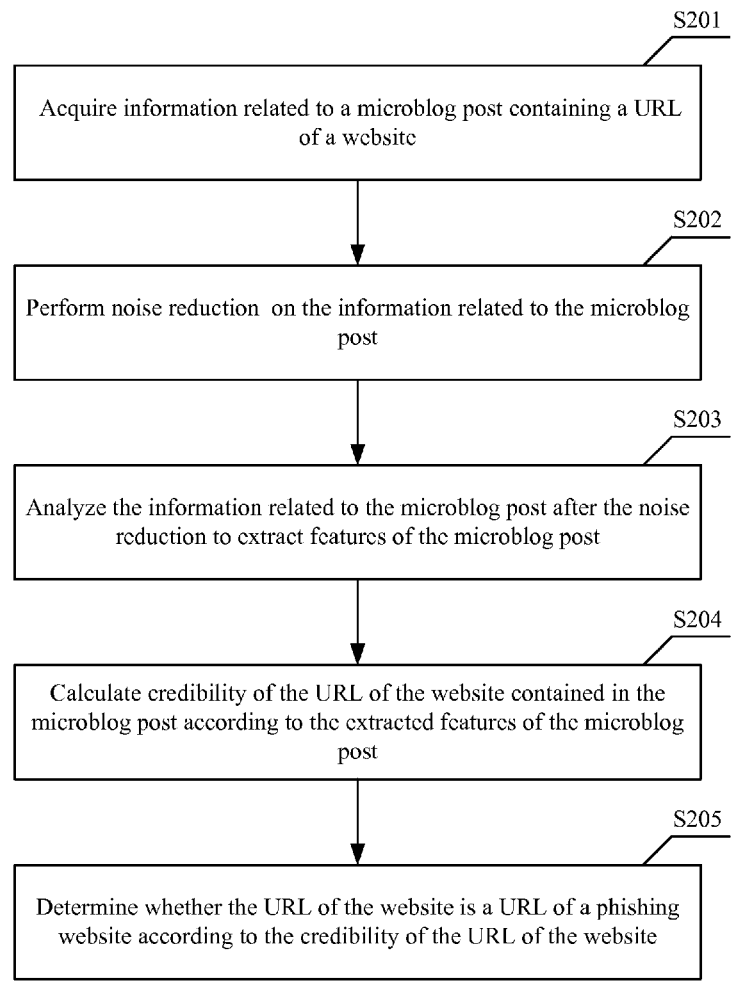
FIG. 3 is a flowchart of a method for detecting a phishing website according to one embodiment of the present invention.

Referring to FIG. 3, a flowchart of a method for detecting a phishing website is shown according to another embodiment of the present invention. The method includes the following steps:

At step S201: information related to a microblog post containing a URL of a website is acquired.

In one embodiment, the information related to the microblog post includes functional features, social networking features and propagation features, where the functional features include the length of the microblog post, content of the microblog post, and the like; the social networking features include an identity of a microblog poster, whether real name authentication is passed, the age of the microblog poster, microblog account registration time, a microblog level, the number of microblog posts (original posts and re-posts), the number of followers or fans, information about followers or fans, an activity status, and the like; and the propagation features include the number of re-posts and comments, features of re-posters and commenters, and the like.

At step S202: noise reduction is performed on the information related to the microblog post.

At step S203: the information related to the microblog post after the noise reduction is analyzed to extract features of the microblog post.

In one embodiment, the features of the microblog post include functional features, social networking features and propagation features of the microblog post.

At step S204: credibility of the URL of the website contained in the microblog post is calculated according to the extracted features of the microblog post.

Assuming that the credibility of the URL of the website is c, c is comprehensively determined according to functional features, social networking features and propagation features based on a preset weight ratio, where the functional features, the social networking features and the propagation features are comprehensively determined according to a plurality of different functional feature descriptors corresponding to the functional features, the social networking features and the propagation features based on a preset weight ratio, respectively.

Specifically, $c=\{(f,p_f), (s,p_s), (d,p_d)\}$, where, f represents functional features, $f=\{(f_1,p_{f1}), (f_2,p_{f2}), (f_3,p_{f3}),\ldots,(f_n,p_{fn})\}$, $f_i$ represents a functional feature descriptor, $i=\{1, 2, 3,\ldots, n\}$, n represents the number of functional feature descriptors, and $p_{fi}$ represents a weight of the functional feature descriptor $f_i$;

$p_f$ represents weights of the functional features f;

for example, $f_1$ represents the length of the microblog post, and $f_2$ represents existence of certain words or emotional words; $p_{f1}$ represents a weight of the length of the microblog post, and $p_{f2}$ represents a weight of existence of certain words or emotional words;

s represents social networking features, $s=\{(s_1,p_{s1}), (s_2,p_{s2}), (s_3,p_{s3}),\ldots,(s_n,p_{sn})\}$, $s_i$ represents a social networking feature descriptor, $i=\{1, 2, 3,\ldots, n\}$, n represents the number of social networking feature descriptors, and $p_{si}$ represents a weight of the social networking feature descriptor $S_i$;

$p_s$ represents weights of the social networking features s;

for example, $S_1$ represents an identity of a microblog poster, $S_2$ represents real name authentication, $S_3$ represents age, $S_4$ represents microblog account registration time, $S_5$ represents a microblog level, $S_6$ represents the number of microblog posts (original posts and re-posts), $S_7$ represents the number of followers or fans, $S_8$ represents information about followers or fans, and $S_9$ represents an activity status;

$p_{s1}$ represents a weight of the identity of the microblog poster, $p_{s2}$ represents a weight of real name authentication, $p_{s3}$ represents a weight of age, $p_{s4}$ represents a weight of the microblog account registration time, $p_{s5}$ represents a weight of the microblog level, $p_{s6}$ represents a weight of the number of microblog posts (original posts and re-posts), $p_{s7}$ represents a weight of the number of followers or fans, $p_{s8}$ represents a weight of the information about followers or fans, and $p_{s9}$ represents a weight of the activity status;

d represents propagation features, $d=\{(d_1,p_{d1}), (d_2,p_{d2}), (d_3,p_{d3}),\ldots,(d_n,p_{dn})\}$, $d_i$ represents a propagation feature descriptor, $i=\{1, 2, 3,\ldots, n\}$, n represents the number of propagation feature descriptors, and $p_{di}$, represents a weight of the propagation feature descriptor $d_i$;

$p_d$ represents weights of the propagation features d;

for example, $d_1$ represents the number of re-posts and comments, and $d_2$ represents features of re-posters and commenters; $p_{d1}$ represents a weight of the number of re-posts and comments, and $p_{d2}$ represents a weight of the features of re-posters and commenters.

At step S205: whether the URL of the website is a URL of a phishing website is determined according to the credibility of the URL of the website.

When the credibility c of the URL of the website is $\geq T_w$, it is determined that the URL of the website is credible, where $T_w$ is a preset credible threshold.

When the credibility c of the URL of the website is $\leq T_B$, it is determined that the URL of the website is non-credible, and it is determined that the URL of the website is a URL of a phishing website, where $T_B$ is a preset non-credible threshold.

When the credibility c of the URL of the website satisfies $T_w>c>T_B$, it is determined that the URL of the website is unknown.

The preset non-credible threshold $T_B$ and the preset credible threshold $T_w$ are obtained in the following manner:

selecting keywords (such as bank and taobao) that are frequently used in phishing, collecting microblog posts containing URLs by using the keywords to form a data set, performing word segmentation and data formatting on the data set, and extracting functional features, social networking features and propagation features;

manually marking credible results of the URLs in the data set, and grouping a training set and a test set at a ratio of 4:1 at random; and training and testing classification models by means of cross-checking, where the classification models may be supervised learning models such as SVM, decision trees, and Bayes networks, and according to the experiment in the paper "Information Credibility on Twitter" by Carlos Castillo et al., a high accuracy can be obtained by a J48 decision tree; and defining the probability from the root node of the decision tree to a non-credible class leaf node and the probability from the root node of the decision tree to a credible class leaf node as a non-credible threshold and a credible threshold respectively, thereby obtaining the preset non-credible threshold $T_B$ and the preset credible threshold $T_w$.

Figure 4:
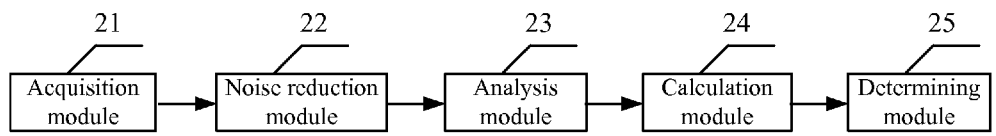
FIG. 4 is a functional block diagram of a system for detecting a phishing website according to one embodiment of the present invention.

Referring to FIG. 4, a system for detecting a phishing website is shown another embodiment of the present invention. The system includes an acquisition module 21, a noise reduction module 22, an analysis module 23, a calculation module 24, and a determining module 25.

The acquisition module 21 is used for acquiring information related to a microblog post containing a URL of a website. In the fourth embodiment of the present invention, the information related to the microblog post includes functional features, social networking features and propagation features, where the functional features include the length of the microblog post, content of the microblog post, and the like; the social networking features include an identity of a microblog poster, whether real name authentication is passed, the age of the microblog poster, microblog account registration time, a microblog level, the number of microblog posts (original posts and re-posts), the number of followers or fans, information about followers or fans, an activity status, and the like; and the propagation features include the number of re-posts and comments, features of re-posters and commenters, and the like.

The noise reduction module 22 is used for performing noise reduction on the information related to the microblog post.

The analysis module 23 is used for analyzing the information related to the microblog post after the noise reduction to extract features of the microblog post. In the fourth embodiment of the present invention, the features of the microblog post include functional features, social networking features and propagation features of the microblog post.

The calculation module 24 is used for calculating credibility of the URL of the website contained in the microblog post according to the extracted features of the microblog post.

Assuming that the credibility of the URL of the website is c, c is comprehensively determined according to functional features, social networking features and propagation features based on a preset weight ratio, where the functional features, the social networking features and the propagation features are comprehensively determined according to a plurality of different functional feature descriptors corresponding to the functional features, the social networking features and the propagation features based on a preset weight ratio, respectively.

Specifically, $c=\{(f,p_f), (s,p_s), (d,p_d)\}$, where, f represents functional features, $f=\{(f_1,p_{f1}), (f_2,p_{f2}), (f_3,p_{f3}), \ldots, (f_n,p_{fn})\}$, $f_i$ represents a functional feature descriptor, $i=\{1, 2, 3, \ldots, n\}$, n represents the number of functional feature descriptors, and $p_{fi}$ represents a weight of the functional feature descriptor $f_i$;

$p_f$ represents weights of the functional features f;

for example, $f_1$ represents the length of the microblog post, and $f_2$ represents existence of certain words or emotional words; $p_{f1}$ represents a weight of the length of the microblog post, and $p_{f2}$ represents a weight of existence of certain words or emotional words;

s represents social networking features, $s=\{(s_1,p_{s1}), (s_2,p_{s2}), (s_3,p_{s3}), \ldots, (s_n,p_{sn})\}$, $s_i$ represents a social networking feature descriptor, $i=\{1, 2, 3, \ldots, n\}$, n represents the number of social networking feature descriptors, and $p_{si}$ represents a weight of the social networking feature descriptor $S_i$;

$p_s$ represents weights of the social networking features s;

for example, $S_1$ represents an identity of a microblog poster, $S_2$ represents real name authentication, $S_3$ represents age, $S_4$ represents microblog account registration time, $S_5$ represents a microblog level, $S_6$ represents the number of microblog posts (original posts and re-posts), $S_7$ represents the number of followers or fans, $S_8$ represents information about followers or fans, and $S_9$ represents an activity status;

$p_{s1}$ represents a weight of the identity of the microblog poster, $p_{s2}$ represents a weight of real name authentication, $p_{s3}$ represents a weight of age, $p_{s4}$ represents a weight of the microblog account registration time, $p_{s5}$ represents a weight of the microblog level, $p_{s6}$ represents a weight of the number of microblog posts (original posts and re-posts), $p_{s7}$ represents a weight of the number of followers or fans, $p_{s8}$ represents a weight of the information about followers or fans, and $p_{s9}$ represents a weight of the activity status;

d represents propagation features, $d=\{(d_1,p_{d1}), (d_2,p_{d2}), (d_3,p_{d3}), \ldots, (d_n n,p_{dn})\}$, $d_i$ represents a propagation feature descriptor, $i=\{1, 2, 3, \ldots, n\}$, n represents the number of propagation feature descriptors, and $p_{di}$ represents a weight of the propagation feature descriptor $d_i$;

$p_d$ represents weights of the propagation features d;

for example, $d_1$ represents the number of re-posts and comments, and $d_2$ represents features of re-posters and commenters; $p_{d1}$ represents a weight of the number of re-posts and comments, and $p_{d2}$ represents a weight of the features of re-posters and commenters.

The determining module 25 is used for determining according to the credibility of the URL of the website whether the URL of the website is a URL of a phishing website.

When the credibility c of the URL of the website is $\geq T_w$, it is determined that the URL of the website is credible, where $T_w$ is a preset credible threshold.

When the credibility c of the URL of the website is $\leq T_B$, it is determined that the URL of the website is non-credible, and it is determined that the URL of the website is a URL of a phishing website, where $T_B$ is a preset non-credible threshold.

When the credibility c of the URL of the website satisfies $T_w > c > T_B$, it is determined that the URL of the website is unknown.

The preset non-credible threshold $T_B$ and the preset credible threshold $T_w$ are obtained in the following manner:

selecting keywords (such as bank and taobao) that are frequently used in phishing, collecting microblog posts containing URLs by using the keywords to form a data set, performing word segmentation and data formatting on the data set, and extracting functional features, social networking features and propagation features;

manually marking credible results of the URLs in the data set, and grouping a training set and a test set at a ratio of 4:1 at random; and training and testing classification models by means of cross-checking, where the classification models may be supervised learning models such as SVM, decision trees, and Bayes networks, and according to the experiment in the paper "Information Credibility on Twitter" by Carlos Castillo et al., a high accuracy can be obtained by a J48 decision tree; and defining the probability from the root node of the decision tree to a non-credible class leaf node and the probability from the root node of the decision tree to a credible class leaf node as a non-credible threshold and a credible threshold respectively, thereby obtaining the preset non-credible threshold $T_B$ and the preset credible threshold $T_w$.

In the embodiments of the present invention, information related to a microblog post containing a URL of a website is acquired, features of the microblog post are extracted from the information related to the microblog post, and credibility of the URL of the website contained in the microblog post is calculated according to the extracted features of the microblog post, so as to determine whether the URL of the website is a URL of a phishing website. Therefore, the present invention solves the problem in the prior art that it cannot be determined whether a URL of a website contained in a microblog post is a URL of a phishing website, thereby providing convenience for users.

One ordinary skill in the art may understand that all or part of the steps in the preceding embodiments may be completed by hardware following instructions of a program.

Another aspect of the present invention provides a non-transitory tangible computer-readable medium storing instructions or codes which, when executed by one or more processors, cause the above system to perform the above method for detection of a phishing website. The non-transitory tangible computer-readable storage medium includes, but not limited to, disk, CD-ROM, read-only memory (ROM), random memory (RAM), flash dive, or the likes.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to activate others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A method for detecting a phishing website, comprising:
   (a) acquiring, by one or more microprocessors, digital information related to a microblog post containing a uniform resource locator (URL) of a website, wherein the digital information related to the microblog post comprises functional features, social networking features and propagation features;
   (b) analyzing, by the one or more microprocessors, the digital information related to the microblog post to extract features of the microblog post, wherein the extracted features of the microblog post comprise the functional features, the social networking features and the propagation features of the microblog post, wherein the functional features comprise a length of the microblog post and content of the microblog post, wherein the social networking features comprise an identity of a microblog poster, whether real name authentication is passed, an age of the microblog poster, microblog account registration time, a microblog level, a number of microblog posts, a number of followers or fans, information about followers or fans and an activity status; and wherein the propagation features comprise the number of re-posts and comments and features of re-posters and commenters;
   (c) calculating, by the one or more microprocessors, credibility of the URL of the website contained in the microblog post according to the extracted features of the microblog post; and
   (d) determining, by the one or more processor, according to the credibility of the URL of the website whether the URL of the website is a URL of a phishing website.

2. The method according to claim 1, after the step of acquiring the digital information related to the microblog post, further comprising:
   performing, by the one or more microprocessors, noise reduction on the digital information related to the microblog post,
   wherein the step of analyzing the digital information related to the microblog post comprises:
   analyzing, by the one or more microprocessors, the digital information related to the microblog post after the noise reduction.

3. The method according to claim 1, wherein the step of calculating the credibility of the URL of the website comprises:
   determining, by the one or more microprocessors, c according to the functional features, the social networking features and the propagation features based on a preset weight ratio, wherein c is the credibility of the URL of the website, wherein the functional features, the social networking features and the propagation features are comprehensively determined according to a plurality of different functional feature descriptors corresponding to the functional features, the social networking features and the propagation features based on the preset weight ratio, respectively.

4. The method according to claim 3, wherein the step of determining according to the credibility of the URL of the website whether the URL of the website is a URL of a phishing website comprises:
   when $c \geq T_w$, determining, by the one or more microprocessors, that the URL of the website is credible, wherein $T_w$ is a preset credible threshold;
   when $c \leq T_B$, determining, by the one or more microprocessors, that the URL of the website is non-credible, and determining that the URL of the website is a URL of a phishing website, wherein $T_B$ is a preset non-credible threshold; and
   when the credibility c of the URL of the website satisfies $T_w > c > T_B$, determining, by the one or more microprocessors, that the URL of the website is unknown.

5. A system for detecting a phishing website, comprising:
   (a) an acquisition module, configured to acquire digital information related to a microblog post containing a uniform resource locator (URL) of a website, wherein the digital information related to the microblog post comprises functional features, social networking features and propagation features;
   (b) an analysis module, configured to analyze the digital information related to the microblog post to extract features of the microblog post, wherein the extracted features of the microblog post comprise the functional features, the social networking features and the propagation features of the microblog post, wherein the functional features comprise a length of the microblog post and content of the microblog post, wherein the social networking features comprise an identity of a microblog poster, whether real name authentication is passed, an age of the microblog poster, microblog account registration time, a microblog level, a number of microblog posts, a number of followers or fans, information about followers or fans and an activity status; and wherein the propagation features comprise the number of re-posts and comments and features of re-posters and commenters;
   (c) a calculation module, configured to for calculate credibility of the URL of the website contained in the microblog post according to the extracted features of the microblog post; and
   (d) a determining module, configured to determine according to the credibility of the URL of the website whether the URL of the website is a URL of a phishing website.

6. The system according to claim 5, further comprising
   a noise reduction module, configured to perform noise reduction on the digital information related to the microblog post;
   wherein the analysis module is configured to analyze the digital information related to the microblog post after the noise reduction, so as to extract functional features, social networking features and propagation features of the microblog post, respectively.

7. The system according to claim 5, wherein the calculation module is configured to determine c according to the functional features, the social networking features and the propagation features based on a preset weight ratio, wherein c is the credibility of the URL of the website, wherein the functional features, the social networking features and the propagation features are comprehensively determined according to a plurality of different functional feature descriptors corresponding to the functional features, the social networking features and the propagation features based on the preset weight ratio, respectively.

8. The system according to claim 7, wherein the determining module is configured to:
   when $c \geq T_w$, determining that the URL of the website is credible, wherein $T_w$ is a preset credible threshold;
   when $c \leq T_B$, determining that the URL of the website is non-credible, and determining that the URL of the website is a URL of a phishing website, wherein $T_B$ is a preset non-credible threshold; and
   when the credibility c of the URL of the website satisfies $T_w > c > T_B$, determining that the URL of the website is unknown.

9. A client terminal, comprising the system for detecting a phishing website according to claim 5.

10. A non-transitory computer-readable medium storing instructions which, when executed by one or more microprocessors, cause a system to perform a method for detecting a phishing website, the method comprising:
   (a) acquiring digital information related to a microblog post containing a uniform resource locator (URL) of a website, wherein the digital information related to the microblog post comprises functional features, social networking features and propagation features;
   (b) analyzing the digital information related to the microblog post to extract features of the microblog post, wherein the extracted features of the microblog post comprise the functional features, the social networking features and the propagation features of the microblog post, wherein the functional features comprise a length of the microblog post and content of the microblog post, wherein the social networking features comprise an identity of a microblog poster, whether real name authentication is passed, an age of the microblog poster, microblog account registration time, a microblog level, a number of microblog posts, a number of followers or fans, information about followers or fans and an activity status; and wherein the propagation features comprise the number of re-posts and comments and features of re-posters and commenters;
   (c) calculating credibility of the URL of the website contained in the microblog post according to the extracted features of the microblog post; and
   (d) determining according to the credibility of the URL of the website whether the URL of the website is a URL of a phishing website.

11. The non-transitory computer-readable medium according to claim 10, wherein after the step of acquiring the digital information related to the microblog post, the method further comprises
   performing noise reduction on the digital information related to the microblog post,
   wherein the step of analyzing the digital information related to the microblog post comprises:
   analyzing the digital information related to the microblog post after the noise reduction.

12. The non-transitory computer-readable medium according to claim 10, wherein the step of calculating the credibility of the URL of the website comprises:
   determining c according to the functional features, the social networking features and the propagation features based on a preset weight ratio, wherein c is the credibility of the URL of the website, wherein the functional features, the social networking features and the propagation features are comprehensively determined according to a plurality of different functional feature descriptors corresponding to the functional features, the social networking features and the propagation features based on the preset weight ratio, respectively.

13. The non-transitory computer-readable medium according to claim 12, wherein the step of determining according to the credibility of the URL of the website whether the URL of the website is a URL of a phishing website comprises:
   when $c \geq T_w$, determining that the URL of the website is credible, wherein $T_w$ is a preset credible threshold;
   when $c \leq T_B$, determining that the URL of the website is non-credible, and determining that the URL of the website is a URL of a phishing website, wherein $T_B$ is a preset non-credible threshold; and
   when the credibility c of the URL of the website satisfies $T_w > c > T_B$, determining that the URL of the website is unknown.

* * * * *